(12) United States Patent
Sage et al.

(10) Patent No.: US 7,725,036 B2
(45) Date of Patent: *May 25, 2010

(54) EFFICIENT TRANSMISSION OF DIGITAL RETURN PATH DATA IN CABLE TELEVISION RETURN PATH

(75) Inventors: Gerald F. Sage, Chico, CA (US); Randy Ichiro Oyadomari, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 2236 days.

This patent is subject to a terminal disclaimer.

(21) Appl. No.: 10/291,208

(22) Filed: Nov. 8, 2002

(65) Prior Publication Data

US 2003/0154496 A1 Aug. 14, 2003

Related U.S. Application Data

(60) Provisional application No. 60/356,955, filed on Feb. 12, 2002.

(51) Int. Cl.
*H04B 10/12* (2006.01)
(52) U.S. Cl. .................. 398/141; 398/154; 398/77; 398/78; 398/115
(58) Field of Classification Search ............ 398/141, 398/154, 77, 78, 115; 725/121, 125, 129
See application file for complete search history.

(56) References Cited

U.S. PATENT DOCUMENTS 4,513,426 A 4/1985 Jayant

| 4,809,271 A | 2/1989 | Kondo et al. |
| 4,862,392 A | 8/1989 | Steiner |
| 4,918,446 A | 4/1990 | Yagi |
| 5,014,309 A | 5/1991 | West, Jr. |
| 5,036,315 A | 7/1991 | Gurley |
| 5,070,402 A | 12/1991 | Ishii et al. |
| 5,091,874 A * | 2/1992 | Watanabe et al. ........... 708/211 |

(Continued)

FOREIGN PATENT DOCUMENTS

WO WO 0025459 5/2000

(Continued)

OTHER PUBLICATIONS

United States Patent and Trademark Office, U.S. Appl. No. 10/845,006, Non-Final Rejection mailed Jun. 24, 2008.

(Continued)

*Primary Examiner*—Ken N Vanderpuye
*Assistant Examiner*—Hibret A Woldekidan
(74) *Attorney, Agent, or Firm*—Workman Nydegger

(57) ABSTRACT

An efficient means for transmitting digitized return path signals over a cable television return path is disclosed. In one embodiment of the invention, the cable television return path includes a node that receives an analog return signal from a subtree of the cable television system and generates a digital transport signal representative of the analog return path signal. The digital transport signal, however, is not a digitized form of the analog return signal. Rather, the digital transport signal is encoded such that fewer bits are used to represent the analog return signal without substantially impacting the accuracy and dynamic range of the signal. At the hub, the digital transport signal is decoded and converted to produce an analog signal that is a close approximation of the analog return signal.

22 Claims, 9 Drawing Sheets

U.S. PATENT DOCUMENTS

| | | | |
|---|---|---|---|
| 5,113,189 A | 5/1992 | Messer et al. | |
| 5,142,690 A | 8/1992 | McMullan, Jr. et al. | |
| 5,150,387 A * | 9/1992 | Yoshikawa et al. | 375/240 |
| 5,155,590 A | 10/1992 | Beyers, II et al. | 358/86 |
| 5,208,854 A | 5/1993 | West, Jr. | |
| 5,225,902 A | 7/1993 | McMullan, Jr. | 358/86 |
| 5,235,619 A | 8/1993 | Beyers, II et al. | |
| 5,243,651 A | 9/1993 | Parikh et al. | |
| 5,245,420 A | 9/1993 | Harney et al. | |
| 5,247,364 A | 9/1993 | Banker et al. | 358/191.1 |
| 5,251,324 A | 10/1993 | McMullan, Jr. | |
| 5,255,086 A | 10/1993 | McMullan, Jr. et al. | |
| 5,301,028 A | 4/1994 | Banker et al. | 348/570 |
| 5,303,295 A | 4/1994 | West et al. | |
| 5,313,467 A | 5/1994 | Varghese et al. | |
| 5,317,391 A | 5/1994 | Banker et al. | 348/6 |
| 5,319,454 A | 6/1994 | Schutte | |
| 5,323,462 A | 6/1994 | Farmer | |
| 5,357,276 A | 10/1994 | Banker et al. | 348/7 |
| 5,430,568 A | 7/1995 | Little et al. | 359/124 |
| 5,442,472 A | 8/1995 | Skrobko | 359/110 |
| 5,481,542 A | 1/1996 | Logston et al. | |
| 5,497,187 A | 3/1996 | Banker et al. | 348/6 |
| 5,499,241 A | 3/1996 | Thompson et al. | 370/73 |
| 5,505,901 A | 4/1996 | Harney et al. | |
| 5,539,822 A | 7/1996 | Lett | 380/20 |
| 5,581,555 A | 12/1996 | Dubberly et al. | 370/487 |
| 5,594,726 A | 1/1997 | Thompson et al. | 370/485 |
| 5,657,333 A * | 8/1997 | Ikekawa | 714/755 |
| 5,680,394 A | 10/1997 | Bingham et al. | |
| 5,684,799 A | 11/1997 | Bigham et al. | |
| 5,719,867 A | 2/1998 | Borazjani | 370/436 |
| 5,719,872 A | 2/1998 | Dubberly et al. | 370/487 |
| 5,794,117 A | 8/1998 | Benard | |
| 5,826,167 A | 10/1998 | Jelinek et al. | 455/5.1 |
| 5,844,706 A | 12/1998 | Kohn et al. | |
| 5,854,703 A | 12/1998 | West, Jr. | 359/167 |
| 5,854,830 A | 12/1998 | Kenmochi | |
| 5,864,560 A | 1/1999 | Li et al. | |
| 5,907,363 A | 5/1999 | Botsford, III et al. | |
| 5,926,478 A | 7/1999 | Ghaibeh et al. | |
| 5,930,231 A | 7/1999 | Miller et al. | 370/210 |
| 5,963,352 A | 10/1999 | Atlas et al. | 359/161 |
| 6,041,056 A | 3/2000 | Bingham et al. | |
| 6,041,066 A | 3/2000 | Meki et al. | |
| 6,161,011 A | 12/2000 | Loveless | 455/426 |
| 6,175,861 B1 | 1/2001 | Williams, Jr. et al. | |
| 6,178,446 B1 | 1/2001 | Gerszberg et al. | |
| 6,272,150 B1 | 8/2001 | Hrastar et al. | 370/486 |
| 6,356,369 B1 | 3/2002 | Farhan | 359/125 |
| 6,356,374 B1 | 3/2002 | Farhan | 359/180 |
| 6,373,611 B1 | 4/2002 | Farhan et al. | 359/180 |
| 6,389,075 B2 * | 5/2002 | Wang et al. | 375/240.16 |
| 6,417,949 B1 * | 7/2002 | Farhan et al. | 398/141 |
| 6,433,906 B1 | 8/2002 | Farhan | 359/167 |
| 6,437,895 B1 | 8/2002 | Farhan et al. | 359/180 |
| 6,449,071 B1 | 9/2002 | Farhan et al. | 359/125 |
| 6,457,178 B1 | 9/2002 | Slim | 725/127 |
| 6,462,851 B1 | 10/2002 | West, Jr. | 359/173 |
| 6,493,005 B1 | 12/2002 | Wu | |
| 6,505,271 B1 * | 1/2003 | Lien et al. | 711/108 |
| 6,519,067 B2 | 2/2003 | Farhan et al. | 359/180 |
| 6,523,177 B1 | 2/2003 | Brown | 725/121 |
| 6,535,715 B2 | 3/2003 | Dapper et al. | |
| 6,622,281 B1 | 9/2003 | Yun et al. | |
| 6,625,166 B2 | 9/2003 | Tsukamoto et al. | |
| 6,715,124 B1 * | 3/2004 | Betts | 714/792 |
| 6,751,269 B1 | 6/2004 | Shalvi et al. | |
| 6,754,221 B1 | 6/2004 | Whitcher et al. | |
| 6,798,790 B1 | 9/2004 | Enssle et al. | |
| 6,831,901 B2 | 12/2004 | Millar | |
| 7,000,018 B1 | 2/2006 | Begis | |
| 7,131,024 B1 | 10/2006 | Venkata et al. | |
| 7,222,358 B2 | 5/2007 | Levinson et al. | |
| 7,257,328 B2 * | 8/2007 | Levinson et al. | 398/182 |
| 7,519,078 B2 * | 4/2009 | Oyadomari et al. | 370/465 |
| 2002/0073434 A1 | 6/2002 | Pience | |
| 2002/0085589 A1 | 7/2002 | Dravida et al. | |
| 2002/0129379 A1 | 9/2002 | Levinson et al. | |
| 2002/0131426 A1 | 9/2002 | Amit et al. | |
| 2002/0171899 A1 * | 11/2002 | Gurusami et al. | 359/173 |
| 2003/0035445 A1 | 2/2003 | Choi | |
| 2005/0039103 A1 | 2/2005 | Azenko et al. | |
| 2006/0013194 A1 | 1/2006 | Baumann et al. | |

FOREIGN PATENT DOCUMENTS

| | | |
|---|---|---|
| WO | WO 0143441 | 6/2001 |
| WO | WO 0152455 | 7/2001 |

OTHER PUBLICATIONS

United States Patent and Trademark Office, U.S. Appl. No. 10/845,006, Final Rejection mailed Dec. 23, 2008.

United States Patent and Trademark Office, U.S. Appl. No. 10/845,006, Non-Final Rejection mailed Aug. 7, 2009.

United States Patent and Trademark Office, U.S. Appl. No. 09/735,710, Non-Final Rejection mailed Dec. 28, 2005.

United States Patent and Trademark Office, U.S. Appl. No. 09/735,710, Non-Final Rejection mailed Jun. 2, 2006.

United States Patent and Trademark Office, U.S. Appl. No. 09/735,710, Final Rejection mailed Oct. 30, 2006.

United States Patent and Trademark Office, U.S. Appl. No. 09/735,710, Notice of Allowance mailed Apr. 9, 2007.

United States Patent and Trademark Office, U.S. Appl. No. 10/285,205, Non-Final Rejection mailed Jan. 6, 2006.

United States Patent and Trademark Office, U.S. Appl. No. 10/285,205, Final Rejection mailed Jul. 25, 2006.

United States Patent and Trademark Office, U.S. Appl. No. 10/285,205, Notice of Allowance mailed Jan. 22, 2007.

United States Patent and Trademark Office, U.S. Appl. No. 10/845,202, Non-Final Rejection mailed Apr. 4, 2008.

United States Patent and Trademark Office, U.S. Appl. No. 10/845,202, Notice of Allowance mailed Dec. 5, 2008.

United States Patent and Trademark Office, U.S. Appl. No. 10/102,619, Non-Final Rejection mailed Apr. 29, 2008.

United States Patent and Trademark Office, U.S. Appl. No. 10/102,619, Final Rejection mailed Dec. 8, 2008.

United States Patent and Trademark Office, U.S. Appl. No. 10/102,619, Non-Final Rejection mailed Jul. 24, 2009.

United States Patent and Trademark Office, U.S. Appl. No. 10/909,478, Non-Final Rejection mailed Mar. 27, 2008.

United States Patent and Trademark Office, U.S. Appl. No. 10/909,478, Non-Final Rejection mailed Oct. 1, 2008.

United States Patent and Trademark Office, U.S. Appl. No. 10/909,478, Final Rejection mailed Jun. 23, 2009.

* cited by examiner

| A/D Sample | $A_9$ | $A_8$ | $A_7$ | $A_6$ | $A_5$ | $A_4$ | $A_3$ | $A_2$ | $A_1$ | $A_0$ |
|---|---|---|---|---|---|---|---|---|---|---|
| Transport Sample |  | 0 | 0 | $A_6$ | $A_5$ | $A_4$ | $A_3$ | $A_2$ | $A_1$ | $A_0$ |
| D/A Sample | $A_9$ | $A_8$ | $A_7$ | $A_6$ | $A_5$ | $A_4$ | $A_3$ | $A_2$ | $A_1$ | $A_0$ |

Fig. 9A – Small Positive Sample

| A/D Sample | $A_9$ | $A_8$ | $A_7$ | $A_6$ | $A_5$ | $A_4$ | $A_3$ | $A_2$ | $A_1$ | $A_0$ |
|---|---|---|---|---|---|---|---|---|---|---|
| Transport Sample |  | 0 | 1 | $A_6$ | $A_5$ | $A_4$ | $A_3$ | $A_2$ | $A_1$ | $A_0$ |
| D/A Sample | $A_9$ | $A_8$ | $A_7$ | $A_6$ | $A_5$ | $A_4$ | $A_3$ | $A_2$ | $A_1$ | $A_0$ |

Fig. 9B – Small Negative Sample

| A/D Sample | $A_9$ | $A_8$ | $A_7$ | $A_6$ | $A_5$ | $A_4$ | $A_3$ | $A_2$ | $A_1$ | $A_0$ |
|---|---|---|---|---|---|---|---|---|---|---|
| Transport Sample |  | 1 | 0 | $A_7$ | $A_6$ | $A_5$ | $A_4$ | $A_3$ | $A_2$ | $A_1$ |
| D/A Sample | $A_9$ | $A_8$ | $A_7$ | $A_6$ | $A_5$ | $A_4$ | $A_3$ | $A_2$ | $A_1$ | 0 |

Fig. 9C – Medium Sample

| A/D Sample | $A_9$ | $A_8$ | $A_7$ | $A_6$ | $A_5$ | $A_4$ | $A_3$ | $A_2$ | $A_1$ | $A_0$ |
|---|---|---|---|---|---|---|---|---|---|---|
| Transport Sample |  | 1 | 1 | $A_8$ | $A_7$ | $A_6$ | $A_5$ | $A_4$ | $A_3$ | $A_2$ |
| D/A Sample | $A_9$ | $A_8$ | $A_7$ | $A_6$ | $A_5$ | $A_4$ | $A_3$ | $A_2$ | 0 | 0 |

Fig. 9D – Large Sample

EFFICIENT TRANSMISSION OF DIGITAL RETURN PATH DATA IN CABLE TELEVISION RETURN PATH

The present application claims priority, under 35 U.S.C. 119(e), to U.S. Provisional Patent Application Ser. No. 60/356,955, filed Feb. 12, 2002, which is incorporated herein by reference. The present application also claims priority, under 35 U.S.C. 120, to U.S. patent application Ser. No. 10/102,625, filed Mar. 19, 2002, which is also incorporated herein by reference. Both applications to which priority is claimed have the same title as above.

BRIEF DESCRIPTION OF THE INVENTION

The present invention is related generally to upstream data communications over networks primarily designed for downstream transmission of television and data signals. More specifically, the present invention pertains to a device and method for improving performance of digital return path links for a cable television (CATV) hybrid fiber co-axial cable (coax) system.

BACKGROUND OF THE INVENTION

Cable television systems (CATV) were initially deployed so that remotely located communities were allowed to place a receiver on a hilltop and then use coaxial cable and amplifiers to distribute received signals down to the town which otherwise had poor signal reception. These early systems brought the signal down from the antennas to a "head end" and then distributed the signals out from this point. Since the purpose was to distribute television channels throughout a community, the systems were designed to be one-way and did not have the capability to take information back from subscribers to the head end.

Over time, it was realized that the basic system infrastructure could be made to operate two-way with the addition of some new components. Two-way CATV was used for many years to carry back some locally generated video programming to the head end where it could be up-converted to a carrier frequency compatible with the normal television channels.

Definitions for CATV systems today call the normal broadcast direction from the head end to the subscribers the "forward path" and the direction from the subscribers back to the head end the "return path." A good review of much of today's existing return path technology is contained in the book entitled *Return Systems for Hybrid Fiber Coax Cable TV Networks* by Donald Raskin and Dean Stoneback, hereby incorporated by reference as background information.

One innovation, which has become pervasive throughout the CATV industry over the past decade, is the introduction of fiber optics technology. Optical links have been used to break up the original tree and branch architecture of most CATV systems and to replace that with an architecture labeled Hybrid Fiber/Coax (HFC). In this approach, optical fibers connect the head end of the system to neighborhood nodes, and then coaxial cable is used to connect the neighborhood nodes to homes, businesses and the like in a small geographical area.

FIG. 1 is a block diagram of a digital return path 100 of a prior art cable television system that uses conventional analog return path optical fiber links. As shown, analog return signals, which include signals generated by cable modems and set top boxes, are present on the coaxial cable 102 returning from the customer. The coaxial cable 102 is terminated at a node 110 where the analog return signals are converted to a digital representation by an A/D converter 112. The digital signal is used to modulate an optical data transmitter 114 and the resulting optical signal is sent over an optical fiber 106 to a hub 120. At the hub 120, the optical signal is detected by an optical receiver 122, and the detected digital signal is used to drive a D/A converter 124 whose output is the recovered analog return signals.

The analog return signals present on the coaxial cable 102 are typically a collection of independent signals. Some of these independent signals may have high peak values and some of the signals may be low level signals. To detect the low level analog return signals and to accommodate the high level analog return signals at the same time, an A/D converter with a large number of bits (e.g., a 10-bit A/D converter) is typically used in the node 110. In the United States, because the analog return signals are in the frequency range of 5 to 42 MHz, the sampling rate of the A/D converter is typically about 100 MHz. A 10-bit A/D converter operating at a sample rate of 100 MHz will output data at a rate of 1 Gbps. Therefore, optical transmitters and the optical receivers in an CATV optical link must be capable of transmitting and receiving optical signals at 1 Gbps or at a higher rate. Naturally, the costs of such high-speed optical equipment are high. Limits on the bandwidth of the optical equipment also restrict the number of analog return signals that can be bundled together for transmission on the same optical fiber.

Accordingly, there exists a need for a system and method for transmitting digital data on the CATV return path at a rate that is lower than a full rate without significant loss of performance.

SUMMARY OF THE INVENTION

An embodiment of the present invention is a cable television return path at which analog return signals are converted to digital format and encoded, and then transmitted across an optical link to a hub. At the hub, the encoded digital signal is decoded and converted to produce an analog signal that is a close approximation of the analog return signal. The encoding scheme of the present embodiment is efficient in reducing the number of bits that are transported across the optical link. Yet, the accuracy of the analog return signal is not substantially compromised. Furthermore, the encoding scheme of the present embodiment is simple, suitable for high-speed operations and cost-effective.

In one embodiment, the cable television return path includes a node that receives an analog return signal from a subtree of the cable television system and generates a digital transport signal representative of the analog return path signal. The digital transport signal, however, is not a digitized form of the analog return signal. Rather, the digital transport signal is encoded such that fewer bits are used to represent the analog return signal without substantially impacting the accuracy and dynamic range of the signal. At the hub, the digital transport signal is decoded and converted to produce an analog signal that is a close approximation of the analog return signal. Because the digital transport signal has fewer bits per sample, a reduced number of bits will be transmitted across the optical link, thus allowing the optical link to operate at a lower transmission rate. At the same transmission rate, a larger number of return signals can be communicated across the optical link. This means that a larger number of analog return links can be bundled together and transported across the optical link.

In one particular embodiment, the node of the cable television return path includes an N-bit A/D converter, an optical transmitter, and an encoder coupled between the A/D converter and the optical transmitter. The encoder is configured to receive N-bit digital samples from the A/D converter and to generate digital samples with fewer than N bits per sample. Each sample includes a sign bit. In this embodiment, the encoder determines a size of each of the N-bit digital samples, and generates selection bits for each sample indicative of the sample's determined size. In one example, there are four different sizes: small positive and negative, medium, and large, covering eight possible ranges of an N-bit sample (the medium size covers both positive and negative values, and the large size covers two ranges for both positive and negative values). Based on the size, the encoder outputs a transport sample that includes the selection bits and a subset of the N-bits of the digital sample, such as the least-significant bits for a small sample. For other samples sizes, such as a large sample, the transport sample may include a subset of the N-bits that does not include, for example, the two least significant bits The output of the encoder is then passed to the optical transmitter to be converted to an optical signal for transmission to the hub.

In this embodiment, the hub of the cable television return path includes an optical receiver, a D/A converter, and a decoder coupled between the optical receiver and the D/A converter. At the hub, transport samples are recovered from the optical signals and provided to the decoder, which uses the selection bits of each transport sample to generate a representation of the one or more selection bits. The representation of the selection bits is combined with the non-selection bits of the transport sample (or a subset of the non-selection bits), and padded with zeros, if necessary, to generate an N-bit sample. The N-bit sample output from the decoder is then provided to the D/A converter to be converted into an analog signal.

BRIEF DESCRIPTION OF THE DRAWINGS

Aspects of the present invention will be more readily apparent from the following description and appended claims when taken in conjunction with the accompanying drawings, in which:

FIG. 9A depicts a relationship between the A/D bits, Ax, the transport bits, Tx, and the D/A bits, Dx, of a small positive sample generated by the decoder of FIG. 8.

FIG. 9B depicts a relationship between the A/D bits, Ax, the transport bits, Tx, and the D/A bits, Dx, of a small negative sample generated by the decoder of FIG. 8.

FIG. 9C depicts a relationship between the A/D bits, Ax, the transport bits, Tx, and the D/A bits, Dx, of a medium sample generated by the decoder of FIG. 8.

FIG. 9D depicts a relationship between the A/D bits, Ax, the transport bits, Tx, and the D/A bits, Dx, of a large sample generated by the decoder of FIG. 8.

DESCRIPTION OF THE PREFERRED EMBODIMENTS

Figure 1:
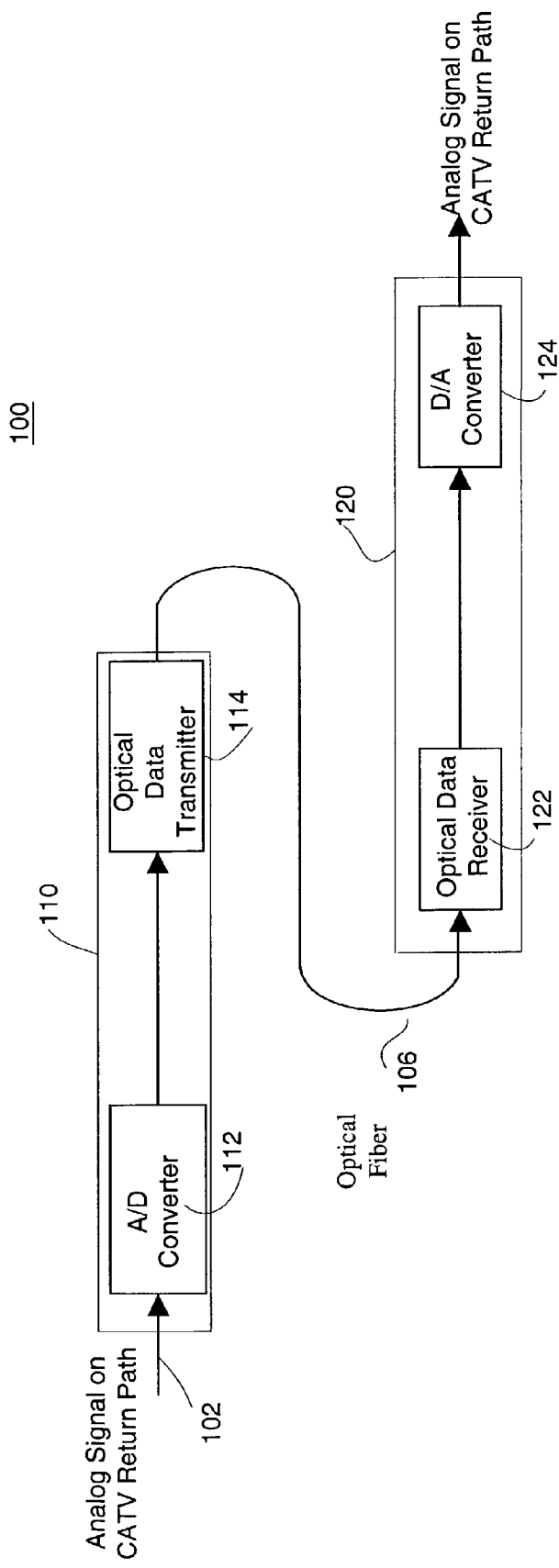
FIG. 1 is a block diagram depicting a cable television (CATV) digital return path of the prior art.
Figure 2:
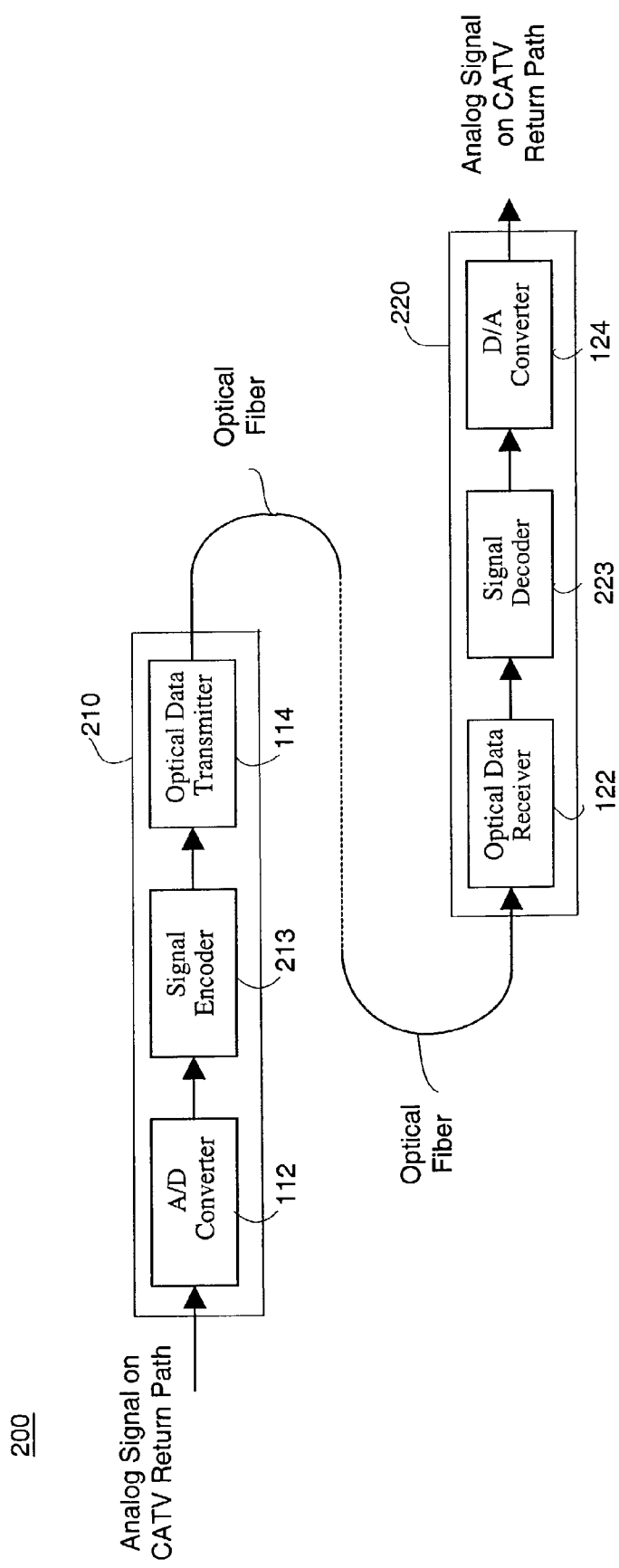
FIG. 2 is a block diagram depicting a CATV return path according to one embodiment of the present invention.

FIG. 2 is a block diagram depicting a CATV return path 200 according to one embodiment of the present invention. At the CATV return path transmitter 210, a signal encoder 213 is coupled to receive and encode the data signal output of the A/D converter 112. The encoded data signal (output by the encoder 213) is provided to the optical transmitter 114 for transmission to a hub 220. At the hub 220, the signal receiver 122 recovers and generates a local replica of the encoded data signal, and a signal decoder 223 is coupled to receive and decode the encoded data signal. The output of the decoder 223, which is a decoded data signal, is provided to a D/A converter 124 for conversion into analog signals. In this embodiment, the signal encoder 213 and signal decoder 223 allow digital data to be transmitted across the optical link at a lower rate than N*F bits per second (where N is the number of bits and F is the sampling frequency of the A/D converter 112) without significant loss of performance.

Figure 3:
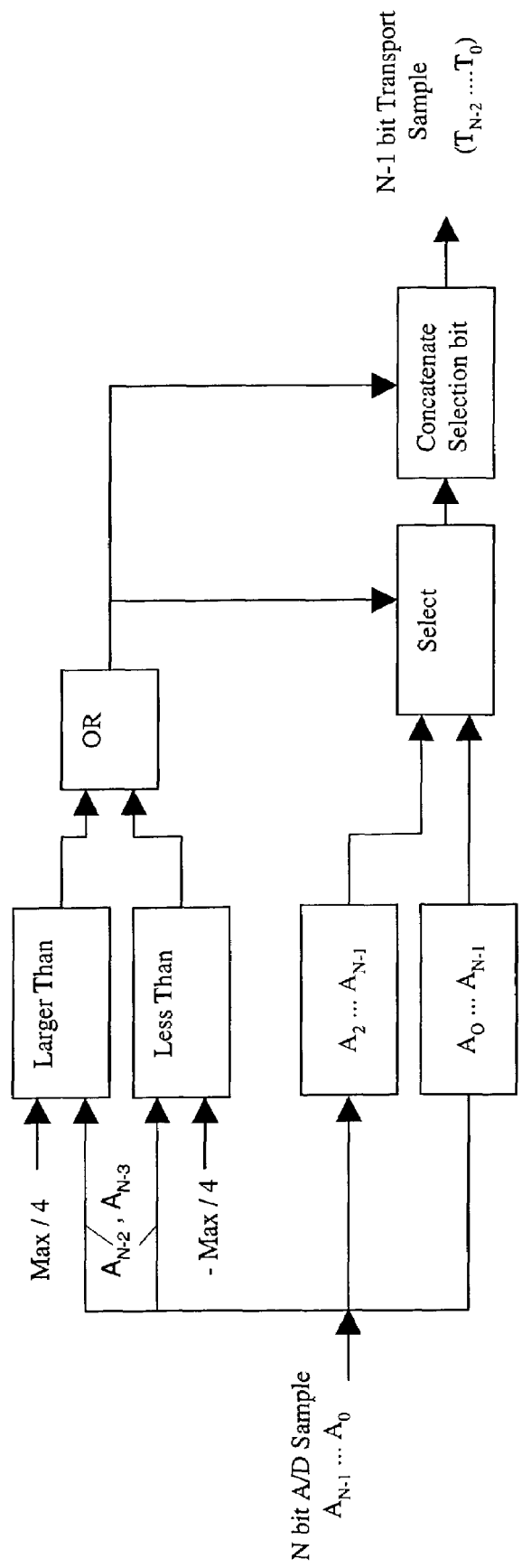
FIG. 3 is a block diagram depicting an encoder that can be used in the CATV return path of FIG. 2, in accordance with one embodiment of the present invention.

One implementation of the signal encoder 213 is shown in FIG. 3. In the present example, the input signal from the A/D converter are N-bit samples Ax with bit $A_{N-1}$ being the most significant and bit $A_0$ the least significant. With 2's complement representation of the value, bit $A_{N-1}$ is a sign bit and bits $A_{N-2}$ to $A_0$ are the amplitude with extended sign. The output of the encoder 213 is N−1 bit samples to be transported. These N−1 bit samples are referred to herein as transport samples.

With reference still to FIG. 3, bits $A_{N-2}$ and $A_{N-3}$ are examined to determine if the amplitude of the N-bit sample is larger than the maximum value of the A/D converter divided by four. If the amplitude is larger than the maximum value of the A/D converter divided by four, the selection bit output of the signal encoder 213 is set to a '1'. If the amplitude is equal to or less than the maximum value of the A/D converter divided by four, then the selection bit is set to a '0'. If the N-bit sample is a positive number and either $A_{N-2}$ or $A_{N-3}$ is equal to '1', the selection bit is set to '1'. If the N-bit sample is a positive number and both $A_{N-2}$ and $A_{N-3}$ are equal to '0', the selection bit is set to '0'. If the N-bit sample is a negative number and either $A_{N-2}$ or $A_{N-3}$ is equal to '0', the selection bit is set to '1'. If the N-bit sample is a negative number and both $A_{N-2}$ and $A_{N-3}$ are equal to '1', the selection bit is set to '0'.

Figure 4A:
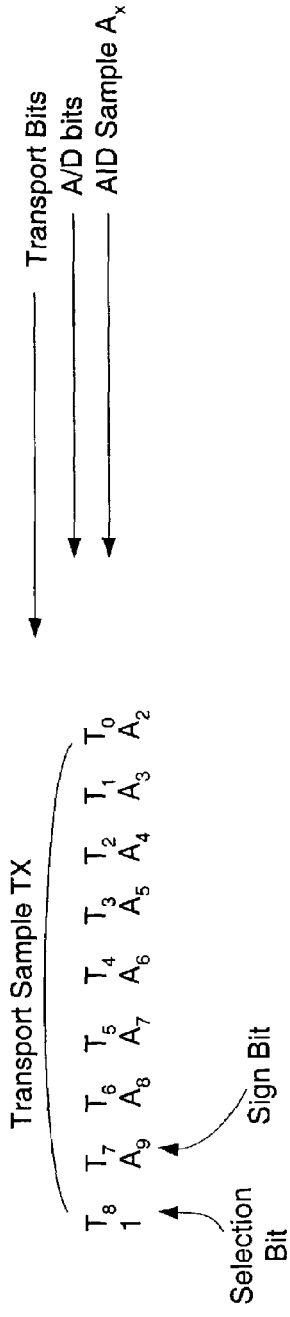
FIG. 4A depicts a relationship between the A/D bits, Ax, of a large sample to the transport bits, Tx, generated by the encoder of FIG. 3.

If the selection bit is '1', a "large" sample is present and the most significant N−2 bits (i.e., $A_{N-1}$ to $A_2$) are transmitted with the selection bit concatenated for a total of N−1 bits. As an example, consider a "large" 10-bit A/D sample, Ax, and a corresponding 9-bit transport sample, Tx, shown in FIG. 4A. This "large" 10-bit A/D sample has an amplitude larger than the maximum value of the A/D converter divided by four. As shown, the selection bit '1' and the most significant N−2 bits (bit $A_9$ to $A_2$) of Ax are mapped to bits $T_8$ to $T_0$ of Tx.

Figure 4B:
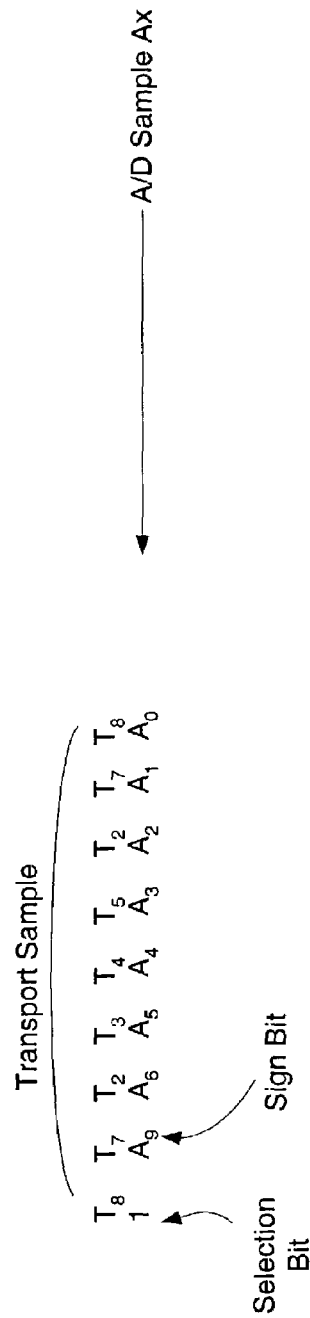
FIG. 4B depicts a relationship between the A/D bits of a small sample to the transport bits generated by the encoder of FIG. 3.

FIG. 4B illustrates a relationship between a "small" 10-bit A/D sample, Ax, and a corresponding transport sample, Tx. As shown, the least significant N−3 bits (e.g., $A_0$ to $A_{N-4}$), together with the sign bit and the selection bit '0', are mapped to bits $T_0$ to $T_8$ of Tx. That is, for a "small" sample whose amplitude is smaller than the maximum value of the A/D converter divided by four, the transmitted bits are: $A_0$ to $A_{N-4}$, $A_{N-1}$ and the selection bit '0' for a total of N−1 bits.

Figure 5:
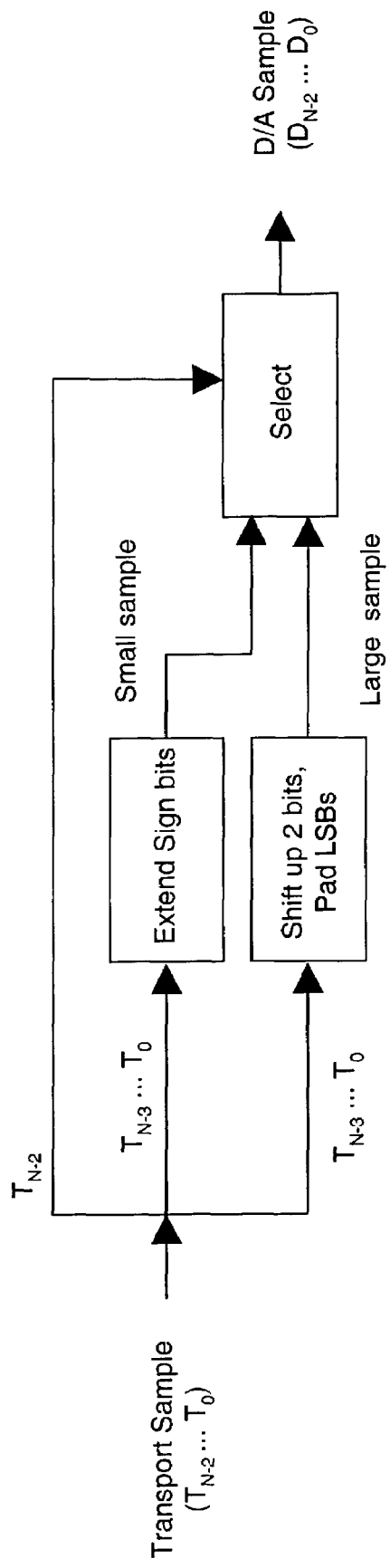
FIG. 5 is a block diagram depicting a decoder that can be used in the CATV return path of FIG. 2, in accordance with one embodiment of the invention.

FIG. 5 is a block diagram depicting the signal decoder 223 according to one embodiment of the present invention. The input signal is the transport sample, Tx, with N−1 bits. The input signal, Tx, is a local replica of the encoded signal. The output is an N bit sample, Dx, for conversion into analog signals by the D/A converter 124.

Figure 6A:
FIG. 6A depicts a relationship between the transport bits, Tx, and the D/A bits, Dx, of a large sample generated by the decoder of FIG. 5.

In operation, the signal decoder 223 examines the transport sample, Tx. If the selection bit is a '1', a "large" sample has been received. The signal decoder 213 then removes the selection bit $T_8$. The D/A sample, Dx, is constructed by mapping the bits $T_0$ through $T_{N-3}$ to the most significant bits of Dx and padding the least two significant bits of Dx with '1' and '0'. As an example, a "large" D/A sample, Dx, constructed from a transport sample Tx is shown in FIG. 6A. In some other embodiments the "large" D/A sample is padded with bits other than '10'.

Figure 6B:
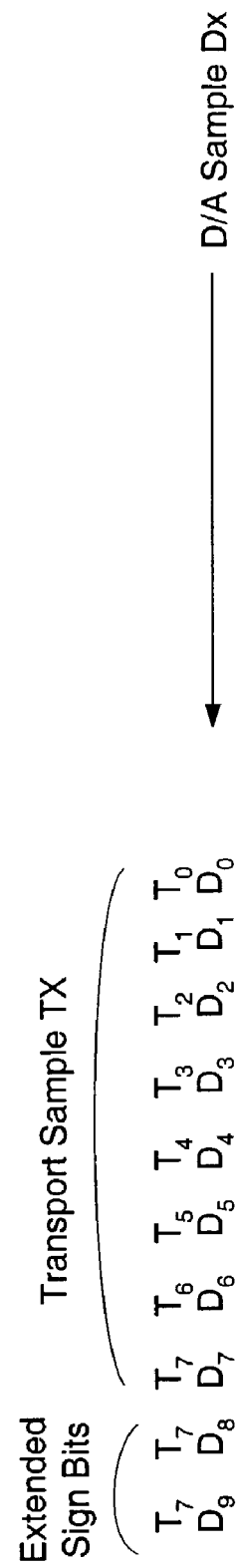
FIG. 6B depicts a relationship between the transport bits, Tx, and the D/A bits, Dx, of a small sample generated by the decoder of FIG. 5.

If the selection bit is a "0", a small sample has been received. The signal decoder 223 removes the selection bit $T_{N-2}$ ($T_{N-2}$ is $T_8$ in our example using 10-bit samples). The D/A sample Dx is constructed by mapping the bits $T_0$ through $T_{N-3}$ to the least significant $D_0$ through $D_{N-3}$ bits and extending the sign bit $T_{N-3}$ ($T_7$ in our example) to fill the $D_{N-1}$ through $D_{N-2}$ bits of the sample Dx. A small D/A sample, Dx, constructed from a transport sample Tx is shown in FIG. 6B.

A preferred embodiment of the present invention, a CATV return path 200 that transports 10-bit A/D samples of a CATV return path signal in 9-bit transport samples, has been described above. In another embodiment, the CATV return path transports return path signals using A/D samples and transport samples that have a different member of bits.

Furthermore, in an embodiment described above, the selection bit gives an offset of two bits between the large and small samples. In other embodiments of the invention, the selection bit may provide an offset of any number of bits between a large and a small sample. For instance, in one embodiment, a selection bit of '1' indicates that N−k most significant bits of the A/D samples are transported, and a selection bit of '0' indicates that the N−(k+1) least significant bits of the A/D samples and their sign bits are mapped to the transport samples. In that embodiment, each transport sample will include N−k+1 bits, for a saving of k−1 bits per sample.

In yet another embodiment, multiple selection bits are used. For this embodiment, the range of possible values for a N-bit digital sample, i.e., the maximum positive value to the maximum negative value, is divided into eight equal size sub-ranges, including four positive and four negative. The smallest positive and negative ranges of values are designated as "small" and, more specifically, as either "small positive" or "small negative." The next largest range of values, both positive and negative, is designated as "medium." The next two largest ranges of values, positive and negative, are designated as "large." Based on the size of the sample (small positive, small negative, medium, or large), a 2-bit code is generated. The 2-bit code is concatenated with a number of bits from the original sample to create a transport sample determined by the value of the 2-bit code, as will be described next.

Figure 7:
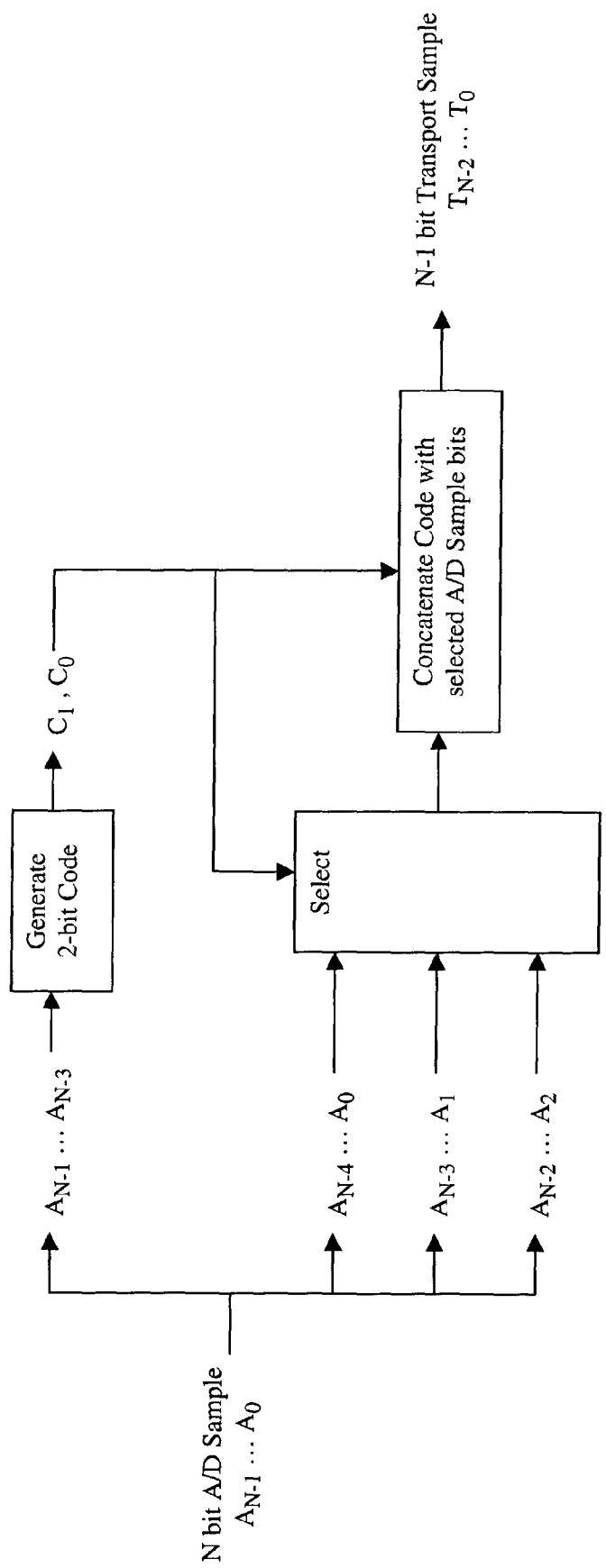
FIG. 7 is a block diagram depicting another encoder that can be used in the CATV return path of FIG. 2, in accordance with another embodiment of the present invention.

Referring to FIG. 7, this embodiment of the signal encoder 213 is shown. In this embodiment, instead of a 2's complement representation of the value, the samples are in offset-binary format. Like a 2's complement representation, offset-binary format is another method for representing signed numbers, and also uses bit $A_{N-1}$ as a sign bit and bits $A_{N-2}$ to $A_0$ as the amplitude. An offset-binary number is derived by determining the largest-possible value for an N-bit sample, dividing that value in half, and assigning the quotient to be the zero value. To determine a positive offset-binary number, the absolute value of the number is added to the zero value, and to determine a negative offset-binary number, the absolute value is subtracted from the zero value. The net effect is to add an offset equal to half the value of the total range.

For example, the following table shows how to determine an offset-binary representation of two numbers, +22 and −7, using an eight-bit representation:

a) largest value for 8-bit integer=$2^8$=256 b) offset-binary zero value=256÷2=$128_{(decimal)}$=1000 0000 (binary)

c) 1000 $0000_{(offset\ binary\ 0)}$+0001 $0110_{(binary\ 22)}$=1001 $0110_{(offset\ binary\ +22)}$ d) 1000 $0000_{(offset\ binary\ 0)}$−0000 $0111_{(binary\ 7)}$=0111 $1001_{(offset\ binary\ -7)}$ Thus, for a 10-bit sample, the greatest integer than can be represented in offset-binary is +511 (11 1111 $1111_{(offset\ binary\ +511)}$), and the greatest negative number is −511 (01 1111 $1111_{(offset\ binary\ -511)}$), for a range of 1023. Because this is not divisible into 8 equal parts, a set of seven ranges of 128 each, and one range of 127, are used instead. The size types and ranges are as follows:

| Size Type | Integer Values | Binary-Offset Values |
| --- | --- | --- |
| Small Positive | 0–127 | 10 0000 0000<br>10 0111 1111 |
| Medium Positive | 128–255 | 10 1000 0000<br>10 1111 1111 |
| Large Positive | 256–511 | 11 0000 0000<br>11 1111 1111 |
| Small Negative | (−1)–(−128) | 01 1111 1111<br>01 1000 0000 |
| Medium Negative | (−129)–(−256) | 01 0111 1111<br>01 0000 0000 |
| Large Negative | (−257)–(−511) | 00 1111 1111<br>00 0000 0001 |

From these sizes and their corresponding binary-offset values, a correlation can be made that the first three bits dictate what size a sample will be. In other words, the encoder can examine bits $A_{N-1}$ through $A_{N-3}$ of the sample to determine which of the eight sizes an N-bit sample falls within. Bits $A_{N-1}$ through $A_{N-3}$ are equal to "100" for a small positive sample, "101" for a medium positive sample, and "110" or "111" for a large positive sample. Similarly, bits $A_{N-1}$ through $A_{N-3}$ are equal to "011" for a small negative sample, "010" for a medium negative sample, and "000" or "001" for a large negative sample. These bits are also referred to herein as the prefix bits of the digital sample.

Because two bits are used for the selection code in this embodiment, only four types of sizes can be coded. Thus, positive and negative sign values are only coded for small samples (i.e., small positive and small negative), whereas medium and large sample values are not coded with a sign value.

In this embodiment, if the N-bit sample is small negative or small positive, bits $A_{N-4}$ through $A_0$ are concatenated with the 2-bit selection code and transmitted as a N−1 bit transport sample $T_X$. If the N-bit sample is medium, bits $A_{N-3}$ through $A_1$ are concatenated with the 2-bit selection code and transmitted, for a total of N−1 bits. Bit $A_0$ is not transmitted in this case, and is thus lost. Finally, if the N-bit sample is large, bits $A_{N-2}$ through $A_2$ are concatenated with the 2-bit selection code and transmitted, again as N−1 bit transport sample $T_X$. In this case, bits $A_1$ and $A_0$ are not transmitted and are therefore lost.

Thus, referring back to FIG. 7, this logic flow is shown for the encoder 213. The encoder receives an N-bit A/D sample, and divides it into four possible subsets: the bits used for selection coding (bits $A_{N-1}$ through $A_{N-3}$); the bits for a small sample (bits $A_{N-4}$ through $A_0$); the bits for a medium sample (bits $A_{N-3}$ through $A_1$); and the bits for a large sample (bits $A_{N-2}$ through $A_2$). The subsets corresponding to the various sample sizes are provided to a multiplexor. The bits for selection coding are provided to logic that generates the 2-bit selection code, $C_1$, $C_0$, in a manner that will be described below. The 2-bit selection code is used as the select signal for the multiplexor, to select from among the various sample subsets, and is then concatenated with the selected subset. In one embodiment, the 2-bit selection code is concatenated as the most-significant bits of the resultant transport sample, but in other embodiments may be concatenated as the least-significant bits or may be inserted elsewhere in the sample subset. The result is the N−1 bit transport sample, $T_X$, having bits $T_{N-2}$ through $T_0$.

Figure 8:
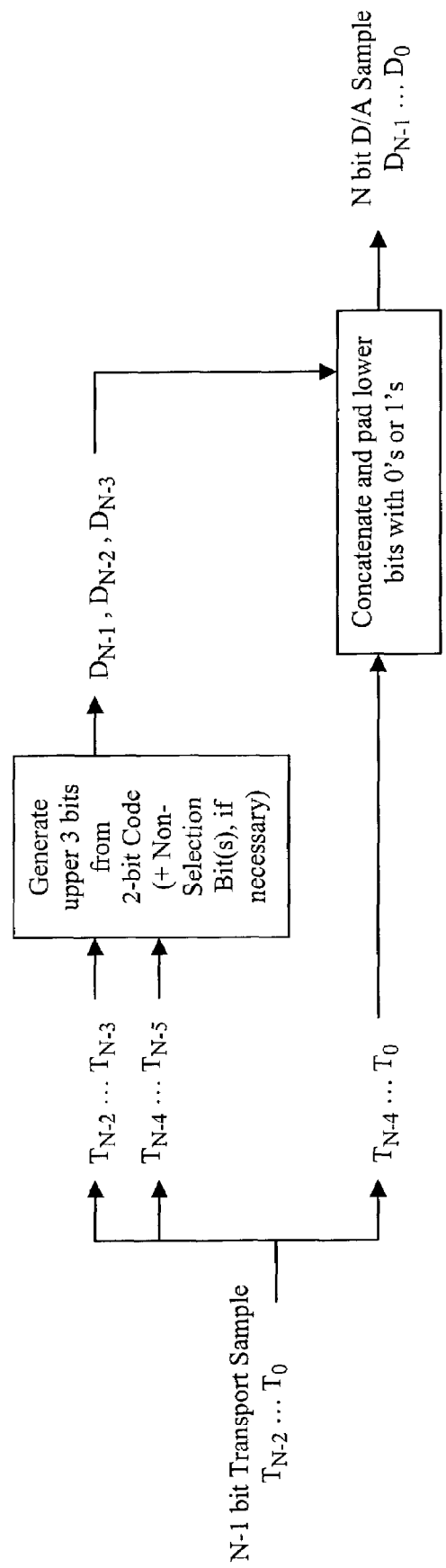
FIG. 8 is a block diagram depicting another decoder that can be used in the CATV return path of FIG. 2, in accordance with an embodiment of the present invention.

As shown in FIG. 8, once the N−1 bit transport sample $T_X$ has been transmitted and received, the receiving signal decoder 223 receives a local replica of the transport sample. As described, the 2-bit selection code of the transport sample (bits $T_{N-2}$ and $T_{N-3}$, in one embodiment) designates whether the sample is small positive, small negative, medium, or large. The first three bits of the recreated digital sample (i.e., $D_{N-1}$, $D_{N-2}$, $D_{N-3}$) can be determined from the 2-bit selection code, plus zero, one or two of the most significant remaining bits (depending on whether the digital sample is small, medium or large), in accordance with the logic detailed above (e.g., a small negative sample contains "011" as the first three bits). Thus, the logic for generating $D_{N-1}$, $D_{N-2}$, $D_{N-3}$ receives selection code bits $T_{N-2}$ and $T_{N-3}$ as well as bits $T_{n-4}$ and $T_{n-5}$. The three recreated bits $D_{N-1}$, $D_{N-2}$, $D_{N-3}$ are also referred to herein as a representation of the selection bits. In other embodiments, the representation of the selection bits may be the selection bits themselves, with no encoding, or may be more or less bits than the number of selection bits, encoded by another encoding scheme.

The first-three bits of the D/A sample are then concatenated with bits $T_{N-4}$ ... $T_0$ of the transport sample (also referred to as the non-selection bits), or a subset of $T_{N-4}$ ... $T_0$, depending on the 2-bit selection code, as explained in further detail below. (In another embodiment, the representation may be selectively truncated instead). Then, depending on the selection code, the result is padded with the requisite number of padding bits (e.g., "0" bits) as the least-significant bits. For some selection codes, however, no padding is necessary. Finally, the result is output as N-bit D/A sample $D_{N-1}$ ... $D_0$ for conversion into analog signals by the D/A converter 124.

The D/A sample $D_X$ will be an exact copy of the original A/D sample $A_X$ for small positive and small negative samples. For medium and large samples, the sample $D_X$ will be a close approximation of the original sample $A_X$. In the case of a medium sample, the least-significant bit of $D_X$ will be lost, and replaced with a "0" bit. For a large sample, the two least-significant bits of $D_X$ will be lost and replaced with "0" bits. The added "0" bits are also referred to as padding bits. In an alternate embodiment, the padding bit for medium samples is a "1" bit, and the padding bits for large samples are "01". In yet other alternate embodiments, the padding bits for large samples are "10" or "11".

FIGS. 9A-D show the relationship between the original A/D sample, the transport sample, and the D/A sample. In this example, the A/D and D/A samples are 10 bits each, while the Transport sample is 9 bits. All four samples sizes are shown.

FIG. 9A shows a small positive sample as it passes through the encoder and decoder. If the A/D sample is in offset-binary format, bits $A_9$ through $A_7$ will be "100," as shown in the table above. This results in a 2-bit selection code of "00", as shown by the first two bits of the transport sample. Sample bits $A_6$ through $A_0$ are concatenated with the selection code. After the transport sample passes through the decoder, the original sample is re-created exactly, such that no bits are lost.

FIG. 9B shows a small negative sample as it passes through the encoder and decoder. If the A/D sample is in offset-binary format, bits $A_9$ through $A_7$ will be "011." This results in a 2-bit selection code of "01," as shown by the transport sample. Again, sample bits $A_6$ through $A_0$ are concatenated with the selection code. Also, again, after the transport sample passes through the decoder, the original sample is re-created exactly, such that no bits are lost.

FIG. 9C shows a medium sample as it passes through the encoder and decoder. If the A/D sample is in offset-binary format, bits $A_9$ through $A_7$ will be "010" if it is a negative sample, or "101" if it is a positive number. This results in a 2-bit selection code of "10", as shown in the transport sample. In order to properly distinguish between "medium negative" and "medium positive" samples, bits $A_7$ through $A_1$ are sent in the transport sample (even though $A_7$ is also used in part to determine the selection code), along with the 2-bit concatenated selection code. This means that bit $A_0$ is lost, and will subsequently be replaced with a "0" bit in the decoder.

FIG. 9D shows a large sample as it passes through the encoder and decoder. If the A/D sample is in offset-binary format, bits $A_9$ through $A_7$ will be "000" or "001" if it is a negative sample, or "110" or "111" if it is a positive sample. This results in a 2-bit selection code of "11", as shown in the transport sample. In order to properly distinguish between the four possible large samples, bits $A_8$ through $A_2$ are sent in the transport sample along with the concatenated 2-bit selection code. This means that bits $A_1$ and $A_0$ are lost, and will subsequently be replaced with "0" bits in the decoder.

In an alternative embodiment that utilizes multiple selection bits, each combination of selection bits is used to select different offsets. For instance, in one embodiment, selection bits of '11' indicate that the N−3 most significant bits (e.g., $A_8$ ... $A_3$, when N=10) of the A/D samples are transported in the transport samples, selection bits of '10' indicate that the N−3 most significant bits other than the MSB (e.g., $A_8$, $A_7$ ... $A_2$) are transported in the transport samples, and so on.

In yet another embodiment of the invention, a block of samples (e.g., three consecutive samples) are encoded by the same set of selection bits. The offset for the largest sample in the block is determined first. All samples in the block are then encoded using one set of selection bits. For instance, consider the example where a block consists of three consecutive 10-bit samples, and where a 2-bit offset between "large" samples and "small" samples" is used. In this example, $A_{N-2}$ and $A_{N-3}$ of the largest sample in the block are examined to determine whether the amplitude of the largest sample in the block is larger than the maximum value of the A/D converter divided by four. If so, the N−3 most significant bits of all three samples, including each sample's sign bit, and one selection bit, are mapped to the transport bits of the transport samples. If not, the N−3 least significant bits of all three samples, including each sample's sign bit, are mapped to the transport bits of the transport samples. In this way, even fewer bits are required to be transported across the optical link, and the optical receivers/transmitters can operate at a lower clock rate.

In the examples described above, 1- or 2-bit selection codes are utilized in the transport sample. In other embodiments, however, the selection code can be an X-bit code, thus separating the range of A/D values in different ways than has been described above. In general, the number of distinct possible sizes for an N-bit sample value using an X-bit code is $2^X$. Depending upon the way in which the ranges of A/D values are segmented, and the number of code bits used, different levels of compression may be achieved along with different degrees of error in the regenerated signal.

Also in the example described above, 10-bit A/D and D/A samples are used. In other embodiments, any size A/D and D/A samples may be used, and the A/D and D/A samples can be different sizes. The technique described above may be applied in a similar way to smaller or larger A/D samples, but will still result in a transport sample that is one bit shorter than the A/D sample. In other embodiments, the transport sample can be even smaller than N−1 bits, for example N−2 bits, at a cost of greater loss of information from the A/D sample.

While the present invention has been described with reference to a few specific embodiments, the description is illustrative of the invention and is not to be construed as limiting the invention. Various modifications may occur to those skilled in the art without departing from the true spirit and scope of the invention. For instance, embodiments of the present invention described above were implemented by hardware logic (e.g., Field Programmable Gate Array(s)). However, a person of ordinary skill in the art would realize that portions of the present invention can be implemented as a program executable by a digital signal processor.

What is claimed is:

1. A signal encoder for use in a cable television return path, comprising:
   an input configured to receive an N-bit digital input sample from an analog-to-digital converter;
   logic configured to determine a size of the N-bit digital sample, selected from a plurality of distinct possible sizes of an N-bit value, the logic further configured to generate one or more selection output bits indicative of the determined size of the N-bit digital sample;
   logic configured to produce a digital output sample representative of the N-bit digital input sample, the digital output sample including a subset of the N-bits of the digital input sample selected from among a plurality of possible subsets for the N-bits, the subset of the N bits being selected in accordance with the one or more selection output bits, the digital output sample further including the one or more selection output bits, but fewer total bits than N; and
   an output, coupled to the logic, configured to provide the digital output sample to an optical transmitter.

2. The signal encoder of claim 1, wherein the one or more selection output bits comprise two selection output bits.

3. The signal encoder of claim 1, wherein the one or more selection output bits correspond to a number of zeros that will be added to the selected subset of the N-bits by a decoder to regenerate an approximation of the N-bit digital sample.

4. The signal encoder of claim 1, wherein the N-bit digital sample is in offset-binary format.

5. The signal encoder of claim 1, wherein the logic configured to determine a size of the N-bit digital sample determines the size based at least in part on one or more prefix bits of the digital sample.

6. A signal decoder for use in a cable television return path, comprising:
   an input configured to receive an M-bit digital sample from an optical receiver, the M-bit digital sample having M bits that include one or more selection bits and a plurality of non-selection bits;
   logic to generate a representation of the one or more selection bits;
   logic to combine the representation of the one or more selection bits, and one or more non-selection bits of the plurality of non-selection bits, to create a digital output sample;
   logic to optionally insert one or more padding bits into the digital output sample, based at least in part on the one or more selection bits;
   wherein the digital output sample is representative of the M-bit digital sample, but has more bits than the M-bit digital sample; and
   a digital-to-analog converter coupled to the logic, the digital-to-analog converter configured to provide an analog signal corresponding to the digital output sample.

7. The decoder of claim 6, wherein the one or more selection bits comprise a binary-coded value, and further wherein the representation of the one or more selection bits is an unencoded version of the binary-coded value.

8. The decoder of claim 7, wherein the representation corresponds to a size of the M-bit digital sample.

9. The decoder of claim 6, wherein the one or more non-selection bits that are combined with the representation include all of the plurality of non-selection bits, as determined by the one or more selection bits.

10. The decoder of claim 6, wherein the one or more non-selection bits that are combined with the representation are a subset of the plurality of non-selection bits, as determined by the one or more selection bits.

11. The decoder of claim 6, wherein the logic to optionally insert one or more padding bits is configured to insert the one or more padding bits as the least significant bits of the digital output sample.

12. The decoder of claim 6, wherein the M-bit digital sample is in offset-binary format.

13. A cable television return path of a cable television system, comprising:
   an analog-to-digital converter configured to receive an analog return signal from a subtree of the cable television system and configured to generate a first digital signal representative of the analog return signal, the first digital signal having a stream of first digital samples each having N bits;
   an encoder configured to receive the first digital signal and to generate a second digital signal that includes a stream of second digital samples each having a fewer number of bits than N, each of the second digital samples including one or more selection bits and a subset of the N-bits of a corresponding one of the first digital samples, determined by the one or more selection bits;
   an optical transmitter configured to convert the second digital signal into an optical signal;
   an optical receiver configured to receive the optical signal and to convert the optical signal into a replica of the second digital signal;
   a decoder configured to recover a third digital signal from the replica of the second digital signal, the third digital signal including a stream of third digital samples, wherein each of the third digital samples includes N bits; and a digital-to-analog converter configured to convert the third digital signal to an analog signal that is substantially equivalent to the analog return signal.

14. The cable television return path of claim 13, wherein the encoder comprises:

an input configured to receive a digital sample of the first digital signal from the analog-to-digital converter;

logic configured to determine a size of the N-bit digital sample, selected from a plurality of distinct possible sizes of an N-bit value, the logic further configured to generate one or more selection output bits indicative of the determined size of the N-bit digital sample; and logic configured to produce a digital output sample representative of the N-bit digital input sample, the digital output sample including a subset of the N-bits of the digital input sample selected from among a plurality of possible subsets for the N-bits, the subset of the N bits being selected in accordance with the one or more selection output bits, the digital output sample further including the one or more selection output bits, but having fewer total bits than N.

15. The cable television return path of claim 14, wherein the one or more selection output bits generated by the encoder comprise two selection output bits.

16. The cable television return path of claim 14, wherein the one or more selection output bits generated by the encoder correspond to a number of padding bits that will be added to a corresponding third digital sample recovered by the decoder.

17. The cable television return path of claim 13, wherein the decoder comprises:

an input configured to receive a digital sample from an optical receiver, the digital sample having fewer bits than N bits but includes one or more selection bits and a plurality of non-selection bits;

logic to generate a representation of the one or more selection bits;

logic to combine the representation of the one or more selection bits, and one or more non-selection bits of the plurality of non-selection bits, to create a digital output sample; and logic to optionally insert one or more padding bits into the digital output sample, based at least in part on the one or more selection bits;

wherein the digital output sample is representative of the N-bit digital sample, but has more bits than the N-bit digital sample.

18. The cable television return path of claim 17, wherein the one or more selection bits of the digital sample comprise a binary-coded value, and further wherein the representation of the one or more selection bits is an unencoded version of the binary-coded value.

19. The cable television return path of claim 17, wherein the representation generated by the decoder corresponds to a size of the M-bit digital sample.

20. The cable television return path of claim 17, wherein the one or more non-selection bits that are combined with the representation generated by the decoder include all of the plurality of non-selection bits, as determined by the one or more selection bits.

21. The cable television return path of claim 17, wherein the one or more non-selection bits that are combined with the representation generated by the decoder are a subset of the plurality of non-selection bits, as determined by the one or more selection bits.

22. The cable television return path of claim 17, wherein the logic to optionally insert one or more padding bits in the decoder is configured to insert the one or more padding bits as the least significant bits of the digital output sample.

* * * * *